United States Patent [19]

Kurz et al.

[11] 4,382,222
[45] May 3, 1983

[54] SERIES REGULATED RECTIFIER CIRCUIT FOR A BATTERY CHARGING SYSTEM

[75] Inventors: Wolfgang Kurz, Hemmingen; Ulrich Munz, Kirchheim, both of Fed. Rep. of Germany

[73] Assignee: Robert Bosch GmbH, Stuttgart, Fed. Rep. of Germany

[21] Appl. No.: 263,356

[22] Filed: May 14, 1981

[30] Foreign Application Priority Data

May 20, 1980 [DE] Fed. Rep. of Germany ....... 3019144

[51] Int. Cl.$^3$ .......................... H02J 7/14; H02P 13/26
[52] U.S. Cl. ..................................... 320/61; 307/577; 322/89; 363/89
[58] Field of Search ...................... 320/39, 61; 363/89, 363/114, 127; 322/89, 94; 307/577

[56] References Cited

U.S. PATENT DOCUMENTS 3,458,798  7/1969  Fang et al. .......................... 363/127
3,517,296  6/1970  Kuhn .................................... 322/89
4,256,979  3/1981  Hendrickson et al. ............. 307/304

FOREIGN PATENT DOCUMENTS 2061294  6/1972  Fed. Rep. of Germany ........ 320/39
 875564  8/1961  United Kingdom ................ 363/127

Primary Examiner—William H. Beha, Jr.
Attorney, Agent, or Firm—Frishauf, Holtz, Goodman & Woodward

[57] ABSTRACT

A conventional on-off voltage regulator operates a set of power MOSFET switches interposed between the grounded terminal of the battery and each of the diodes of a bridge rectifier leading to that terminal. Each such switch is controlled through an individual circuit responsive to the regulator output and including an optoelectronic device controlling a thryistor which, in addition to being connected to control the MOSFET switch, also has a connection through a resistor and a diode to the other side of the rectifier diode switched by the MOSFET. The circuit greatly simplifies voltage regulation of a battery charging system using an alternator with a permanent magnet rotor.

6 Claims, 1 Drawing Figure

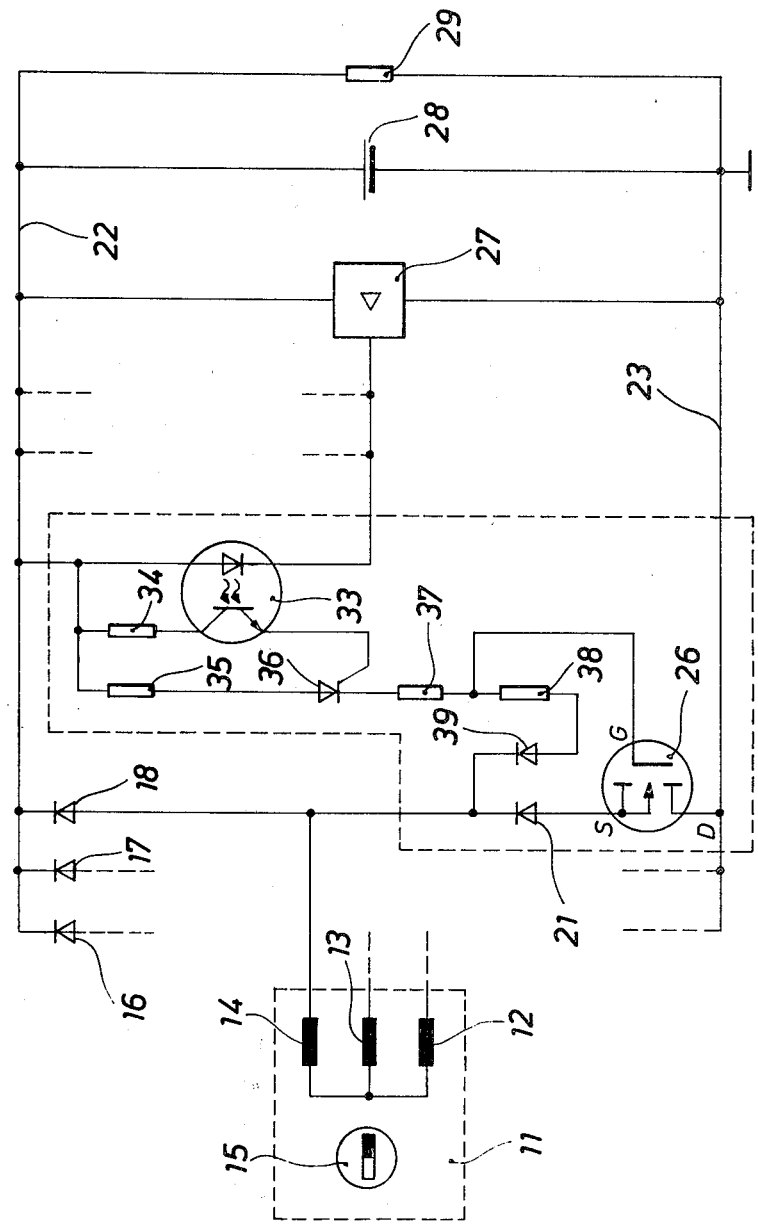

SERIES REGULATED RECTIFIER CIRCUIT FOR A BATTERY CHARGING SYSTEM

RELATED COPENDING APPLICATIONS

Wolfgamg KURZ, Ser. No. 259,555, filed May 1, 1981, claiming priority of German patent application P No. 30 16 955.2, filed May 2, 1980.

This invention concerns battery charging systems, particularly those suitable for vehicular use and energized with an alternator that has a permanent magnet rotor and therefore cannot have its voltage regulated by control of an excitation winding.

Battery charging systems with permanent magnet generators are known in which shunt regulation is provided on the d.c. side by switching in a shunt load. Such systems operate with relatively high loss, however. Systems are also known in which voltage regulation is done with a series regulator on the d.c. side. The series regulation stages must then handle the current under load and must be designed with reference to their power rating and their behavior under switching conditions in a way that provides an expensive device.

Battery charging systems for permanent magnet generators are also known, for example from U.S. Pat. No. 3,517,296 of the assignee of the present application, in which control of the output power of the generator is produced on the a.c. side by series regulation, in this case by utilizing semiconductor controlled rectifiers for the rectifying elements of the rectifier bridge and using "phase-chopping" to limit the portion of each halfwave period in which the rectifier element may be conducting. These systems were not satisfactory because of the circuit expense and because of a certain vulnerability to external disturbance.

THE INVENTION

It is an object of the present invention to provide series regulation on the a.c. side of a bridge rectifier in response to a voltage regulator of the type that became conventional before permanent magnet alternators came into general use. In particular, it is an object to provide such regulation in a reliable and inexpensive manner.

Briefly, in series with at least some of the rectifier elements of the bridge, there are interposed series regulation switching means under control of a set of switching control circuits responsive to the conventional voltage regulator. In particular, a MOSFET switch is interposed in series with each of the rectifying elements on one d.c. side of the bridge, preferably between the rectifying diodes and the grounded side of the rectifier output. Each MOSFET switch has an individual control circuit, including a thyristor connected for response to the voltage regulator.

The circuit of the invention has the advantage that it can be embodied using a production rectifier essentially like those already in use, for example a conventional bridge rectifier, and can employ an on-off voltage regulator of existing production design, and also that the series regulating elements need be only of normal power rating and work with a switching control circuit of low cost. Furthermore, in the case of a failure of a single series regulating element, no complete failure of the voltage regulation system takes place, but rather a satisfactory range of regulation is still maintained.

The use of a MOSFET device for the series regulating element is particularly advantageous because these are reliable in operation and easily controllable. The placement of the MOSFETs on the ground side of the rectifying elements is also advantageous because it makes possible a simple control circuit for these regulating elements. The power components can be connected with a common cooling body that is electrically and thermally connected to chassis ground. It is particularly advantageous to provide a component that stores the phase position of the phase voltage. In that way, it is possible to switch off the MOSFETs at and only at a zero passage of the momentary value of the phase voltage.

The MOSFETs are then never required to switch under load, independently of the particular moment at which the on-off voltage regulator switches to call for a reduction of output voltage. Capacitors for protecting the MOSFETs, which involve expense and space requirements, thereby become unnecessary. A thyristor is advantageously provided as the storage component. It is also convenient to control the thyristor through an opto-electronic device.

THE DRAWING

The invention is further described by way of illustrative example with reference to the annexed drawing, the single FIGURE of which is a circuit diagram of a battery charging system embodying the invention.

DESCRIPTION OF THE ILLUSTRATED EMBODIMENT

A generator 11 has three phase windings 12,13,14 in star connection and a permanent magnet rotor 15. The phase windings 12,13,14 are connected in a known way with a bridge rectifier having the positive side diodes 16,17 and 18 and a corresponding number of negative side diodes, not all of which are shown in the drawing, only the negative side diode 21 connected to the phase winding 14 being shown. The cathodes of the positive side diodes 16,17,18 are connected to the positive bus 22. Between the negative bus 23 and the anodes of the three negative side diodes are interposed the respective switching paths of three MOSFET devices, of which only the MOSFET 26 connected to the negative side diode 21 is shown. The drain electrode of each MOSFET is connected to the negative bus 23.

An on-off regulator 27 of known construction (for example of the kind illustrated in the copending application of one of us, Wolfgang Kurz, Ser. No. 259,555, filed May 1, 1981 claiming the priority of German patent application P No. 30 16 955.2, filed May 2, 1980 has its input connected across the output of the bridge rectifier, as are also connected the battery 28 which is to be charged and the load circuit of the battery symbolized by the resistance 29.

At the output of the voltage regulator 27, three opto-electronic couplers are connected, only one of which, the device 33 associated with the MOSFET 26 and the rectifier diode 21, is shown. The control input of the opto-electronic coupler 33 is connected not only to the output of the on-off voltage regulator 27, but also through an ohmic resistance 34 to the positive voltage bus 22. The output of the opto-electronic coupler 33 is on the one hand connected through an ohmic resistance 35 to the positive bus 22 and, on the other hand to the gate electrode of a thyristor 36. The anode of the thyristor 36 is connected to the positive bus 22, while its cathode is connected through a voltage divider composed of the ohmic resistances 37 and 38 to the anode of the auxiliary diode 39, of which the cathode is connected to the cathode of the negative-side rectifier diode 21 of the rectifier bridge. The gate electrode of the MOSFET 26 is connected with the tap of the voltage divider composed of the resistances 37 and 38.

If the generator 11 is put into operation, the voltage between the positive bus 22 and the negative bus 23 at first lies below a predetermined regulation value of voltage. The regulator 27 switches on, which means that its output essentially assumes the potential of the negative bus 23. A current limited by the resistance 34 then flows through the light-emitting diode (LED) in the opto-electronic coupler 33. The LED lights up and the switching path of the NPN phototransistor of the opto-electronic coupler 33 becomes conducting. The gate of the thyristor 36 thereby receives positive potential and the thyristor 36 is ignited. The ignition current is limited by the resistance 35. Because the thyristor 36 is now conducting, the gate electrode of the MOSFET 26 also takes on a positive potential and the switching path of the MOSFET 26 is made conducting. The bridge rectifier 16 . . . 21 is now in operation and the voltage between the positive bus 22 and the negative bus 23 rises.

As soon as the predetermined reference value of voltage between the positive bus 22 and the negative bus 23 is overstepped by the output voltage of the rectifier bridge, first the voltage regulator 27 switches "off", the opto-electronic coupler 33 then becomes inactive and the thyristor 36 receives no more gate current. After the next passage through zero of the phase voltage of the winding 14, the thyristor 36 goes back into its blocked condition, the gate electrode of the MOSFET 26 returns to the potential of the source electrode of the MOSFET 26 and the switching path of the MOSFET 26 becomes and remains non-conducting. The auxiliary diode 39 is necessary, since the MOSFETs usually have a parasitic diode having an anode at the source and a cathode at the drain.

The word MOSFET is an acronym for metal-oxide-semiconductor-field-effect-transistor.

The thyristor 26 can be replaced by a self-holding (latch) circuit of two transistors. As already mentioned, the complete switching control circuit indicated on the drawing for three-phase systems is provided in triplicate, each with an opto-electronic coupler, a thyristor and a series regulating switching element, such as the MOSFET, but of course in the case of single-phase systems the illustrated control circuit would be provided only in duplicate.

The voltage regulator 27 can be a two-state (on-off) voltage regulator of low power rating of the kind commonly used in various existing types of battery charging systems.

Although the invention has been described with reference to a particular illustrative embodiment, it should accordingly be understood that various modifications are possible within the inventive concept.

We claim:

1. In a battery charging system comprising an alternator, means for rectifying the output of the alternator and a voltage regulator responsive to the rectified voltage for activating and deactivating action corrective of the output voltage, a controlled rectifier circuit responsive to said voltage regulator and comprising:

a bridge rectifier having a first set of rectifier elements serving the positive output terminal and a second set of rectifier elements serving the negative output terminal of said rectifier circuit and having series regulation switching means (26) comprising a MOSFET device interposed in series with each series-regulated rectifier element of at least one of said sets of rectifier elements, and a set of switching control circuits responsive to the output of said voltage regulator for respectively controlling the said series regulation switching means interposed in circuit with said respective rectifier elements, each circuit of said set of circuits including a thyristor (36) for control of one of said MOSFETs (26), the control terminal of said thyristor being connected so as to be responsive to the output of said voltage regulator (27).

2. A rectifier circuit in a battery charging system as defined in claim 1, in which an opto-electronic coupling device (33) is interposed between the gate electrode of each said thyristor (36) and the output of said voltage regulator (27).

3. A rectifier circuit in a battery charging system as defined in claim 3, in which said series regulation switching means are interposed in series with the rectifier elements of only one set of rectifier elements of said bridge rectifier.

4. A rectifier circuit in a battery charging system as defined in claim 3, in which the switching path of each one of said MOSFET devices (26) is interposed between the negative output terminal of said rectifier and the anode of an individual one of said rectifier elements of the set thereof serving the negative terminal of said rectifier.

5. A rectifier circuit in a battery charging system as defined in claim 1 or claim 2, in which the switching path of said thyristor (36) is interposed between the common connection of a pair of rectifier elements of which one is from each of said set of elements and the output terminal of said rectifier which is of polarity opposite to that of the rectifier output terminal to which the MOSFET device (26) controlled by said thyristor is connected.

6. A rectifier circuit in a battery charging system as defined in claim 5, in which said switching path of said thyristor (36) is interposed between said common rectifier element connection and said rectifier circuit terminal in a circuit containing other components (35,37,38,39).

* * * * *

UNITED STATES PATENT AND TRADEMARK OFFICE
CERTIFICATE OF CORRECTION

PATENT NO. : 4,382,222
DATED : May 3, 1983
INVENTOR(S) : Wolfgang KURZ and Ulrich MUNZ It is certified that error appears in the above—identified patent and that said Letters Patent is hereby corrected as shown below:

Claim 3, line 2, change "as defined in claim 3" to -- as defined in claim 1 --

Claim 4, line 2, change "as defined in claim 3" to -- as defined in claim 1 --

Signed and Sealed this

Twenty-first Day of June 1983

[SEAL]

Attest:

DONALD J. QUIGG

Attesting Officer

Acting Commissioner of Patents and Trademarks